United States Patent [19]

Rovetti

[11] 3,861,053

[45] Jan. 21, 1975

[54] METHOD FOR DRYING AND PRESERVING PLANT MATERIAL

[76] Inventor: Melvin G. Rovetti, 2094 Willow pass Rd., Concord, Calif. 94520

[22] Filed: Feb. 15, 1973

[21] Appl. No.: 332,604

[52] U.S. Cl. ............................................ 34/9, 117/3
[51] Int. Cl. ............................................... F26b 3/00
[58] Field of Search ........................ 34/9, 95; 117/3

[56] References Cited
UNITED STATES PATENTS
89,515  4/1869  Stigale .................................. 34/9 X
1,755,496  4/1930  Behrman .................................. 39/9
3,645,766  2/1972  Mazzucato .............................. 117/3

*Primary Examiner*—John J. Camby
*Attorney, Agent, or Firm*—Phillips, Moore, Weissenberger, Lempio & Strabala

[57] ABSTRACT

Plant and related materials are dried in a composition comprising silica gel and borax, and the dried materials protected by coating with a solution of paraffin in an inert hydrocarbon solvent.

4 Claims, No Drawings

METHOD FOR DRYING AND PRESERVING PLANT MATERIAL

BACKGROUND OF THE INVENTION

This invention relates to the drying and preserving of plant and related materials. This invention further relates to a composition for the rapid drying of these materials which will preserve the natural colors and a method for the preserving of such dried materials with a protective coating. Also it involves a composition which can be thermally processed and reused numerous times.

Historically, plant materials, particularly flowers and foliage, have been preserved by dehydrating the tissues of these materials. Although air drying is the traditional method for accomplishing this dehydration, such materials are now typically dried in an inexpensive dehydration medium such as silica gel, borax, cornmeal, sand, and the like.

While these media in general promote more rapid drying of the plant materials than does air drying, with better retention of natural colors, it has been found that disadvantages are associated with these known media. For example, a particular medium may be too heavy, may tend to discolor the substrate material, may be susceptible to insect infestation, or may not be reusable. Recently, it has been found that silica gel is an effective medium for the dehydration of plant and related materials, yielding dried materials of good color in a relatively short period of time. This material is, however, quite expensive, and the cost of drying a large amount of plant material in this medium can be prohibitive.

Further disadvantages associated with dried plant materials obtained by known methods are their fragility and tendency to deteriorate in the presence of dampness. This of course limits their usefulness, by, for example, rendering them difficult to transport, store, or reuse. Known methods of protecting these dried materials, such as by the use of plastic sprays, or dipping in wax, frequently result in damage to the dried materials, or render them less attractive to those who prefer a natural effect. For example, one common method of preserving dried plant materials dipping them in paraffin, normally cannot be successfully employed with the more fragile dried materials, as the weight of the paraffin generally damages the material.

Accordingly it is an object of this invention to provide a method of drying plant and related materials which is inexpensive, rapid, and satisfactorily preserves the natural color of the material.

It is a further object of this invention to provide a dehydration medium for the drying of plant and related materials which is inexpensive, lightweight, reusable, and does not discolor the materials.

It is further object of this invention to provide a method of preserving and protecting dried plant and related materials which can be used for the most fragile of these materials without damaging them.

BRIEF DESCRIPTION OF THE INVENTION

In accordance with the objects of this invention, a method and composition is provided for the drying and preservation of plant and related materials. Broadly, the invention comprises immersing fresh plant and related materials in a composition comprising anhydrous borax and silica gel for a period of time sufficient to substantially dehydrate these materials. The dried materials are then preserved by applying a solution of wax in an inert hydrocarbon solvent to these materials and allowing the solvent to evaporate, thereby forming a protective wax coating on the dried materials which strengthens the somewhat fragile connections between their several parts.

DETAILED DESCRIPTION OF THE INVENTION

The borax/silica gel dehydrating composition of this invention comprises from about 50 percent to about 75 percent by volume of borax, with the remainder silica gel. Preferably, the composition contains about ⅔ borax and about ⅓ silica gel by volume. Generally, borax in amounts exceeding 75 percent by volume adversely affect the drying process, and unsatisfactory results are obtained. Conversely, the addition of silica gel in amounts exceeding 50 percent do not appreciably improve the results, and considerably increase the costs of drying. Silica gel useful in the composition of this invention is readily obtainable commercially, and is available through a number of chemical distributors.

The fresh plant or related materials to be dried are immersed in the dehydrating composition for a period of time sufficient to dry these materials until crisp; caution must be exercised to avoid overexposure of the materials to the dehydrating composition, as the materials will eventually deteriorate under this condition. In general, the drying period may be expected to take from about three to about five days depending on such factors as temperature, humidity, proportions of borax to silica gel, and the moisture in the materials dried. For example, under average conditions, marigolds may require more than a week to become sufficiently dry, while other flowers such as hollyhocks may dry in a very short period of time.

The fresh materials are immersed in the dehydrating composition by any conventional method. It is necessary that the materials be completely covered by the composition, and it is preferred that this be done carefully to avoid damaging the material. Suitably, a container is prepared with a layer of the dehydrating composition, and the fresh material is laid on this base, preferably face up. More composition is then sprinkled carefully onto the fresh material until it is completely covered. It is advantageous if the container is then hermetically sealed against moisture ingress and stored until the material is dry. The dehydrating composition may be reused without further treatment until its absorbent capacity is diminished; thereafter composition may then be restored to its original absorbent capacity by heating. This can be accomplished by exposing the composition to heat for a period of time; for example a dehydrating composition comprising ⅓ silica gel and ⅔ borax by volume in a layer about 2 inches thick can be fully dried at oven temperatures of about 400° F in about 1 hour.

Dried materials obtained by this or other methods may then be preserved by the application of a thin protective coating of wax. By the preservation process of this invention, paraffin or other suitable wax is dissolved in an inert hydrocarbon solvent, and the solution applied to the dried materials, conveniently by a dipping operation. The solvent is then allowed to evaporate, leaving a thin coating of the wax on the dried material. In order to obtain a suitably thin coating of the wax and avoid damaging the material or detracting from its appearance, a solution of not more than about 40 percent by volume of wax is preferred, although in some instances, for example, when stronger dried materials are being used, a more concentrated solution may be appropriate. It is preferable that the solution be at least about 10 percent wax by volume to obtain the desired protection, although, again, a lower concentration may in some instances suffice. Particularly suitable inert hydrocarbon solvents include chlorinated hydrocarbons such as trichloroethane or analogous solvents having a suitably high evaporation rate. If desired, additional ingredients may be added to the wax solution for the purpose of enhancing the appearance of the finished materials, as long as such ingredients are compatible with the solution. For example, it has been found that dyes such as those used in candlemaking may often be advantageously added to the wax solution to enhance the natural color of flowers or foliage; further, appropriate perfumes such as those also used in candlemaking may be added to the wax solution, particularly for coating dried flower material.

The following example illustrates the composition and method of this invention:

EXAMPLE:

Anhydrous borax and silica gel in the proportions of two to one are admixed by stirring and poured in an aluminum tray having the dimensions 18" ×30" ×4" to form a layer 1" deep. Freshly picked hollyhocks are then placed on top of the layer facing up, and additional amounts of the mixture are then carefully added to the tray until the flowers are completely covered. The tray is then sealed to prevent the ingress of atmospheric moisture, and stored for two days. The dried materials are then removed and dipped at room temperature in a solution comprising 10 percent by volume wax in trichloroethane. The solvent is then allowed to evaporate.

What is claimed is:

1. A method of drying and preserving fresh plant and related materials in a dried condition while retaining their natural configurations tomprising:

immersing said materials in a dehydrating composition composed of anhydrous borox and silica gel by placing said materials on a layer of said composition and sifting additional portions of said composition around said materials in a manner so as not to substantially deform their configurations;

sealing said materials immersed in said composition from atmospheric moisture for a period sufficient to substantially dehydrate said materials; and subsequently removing said materials from said composition.

2. The method of claim 1, wherein the composition of borax and silica gel comprises from about 50 percent to about 75 percent borax by volume.

3. The method of claim 1, wherein the plant and related materials are immersed in the dehydrating composition for from about two days to about two weeks.

4. The method as defined in claim 1 wherein subsequent to the removal of the materials from the composition, the additional step is included of immersing said materials in a solution of wax in an inert hydrocarbon solvent having from 10 to 40 percent of wax by volume whereby a thin wax coating will cover said materials when said hydrocarbon solvent evaporates.

* * * * *